United States Patent [19]

Basham

[11] 4,204,405
[45] May 27, 1980

[54] REGENERATIVE DRIVE SYSTEM

[75] Inventor: Dean V. Basham, Selmer, Tenn.

[73] Assignee: Tyrone Hydraulics, Inc., Corinth, Miss.

[21] Appl. No.: 904,260

[22] Filed: May 9, 1978

[51] Int. Cl.² ............................................. F15B 1/02
[52] U.S. Cl. ...................................... 60/371; 60/414; 60/430
[58] Field of Search ................. 60/369, 371, 413, 414, 60/428, 430

[56] References Cited

U.S. PATENT DOCUMENTS

| | | | |
|---|---|---|---|
| 2,802,336 | 8/1957 | Ball | 60/371 |
| 3,205,659 | 9/1965 | Hartzell | 60/414 |

*Primary Examiner*—Edgar W. Geoghegan
*Attorney, Agent, or Firm*—Charles H. Lindrooth

[57] ABSTRACT

A drive system useful for driving reciprocating equipment such as saw mill log carriages or the like is disclosed. The drive system includes a plurality of fixed displacement pumps driven by a prime mover. The pumps in turn drive one or more fixed displacement hydraulic motors which drive the carriage. The pumps are provided with pressure responsive unloading valves which unload at different pressures so that as pressure on the system builds up one or more pumps are sequentially unloaded. An accumulator is charged at low pressures and provides fluid for driving the motors when required at the higher pressures. The inertial forces in the heavy carriage, during the time when the carriage is slowing down, are used to drive the fixed displacement motors as pumps. During this portion of the cycle, the motors are interconnected with the accumulator so that the pumping action of the motors is used to recharge the accumulator.

9 Claims, 2 Drawing Figures

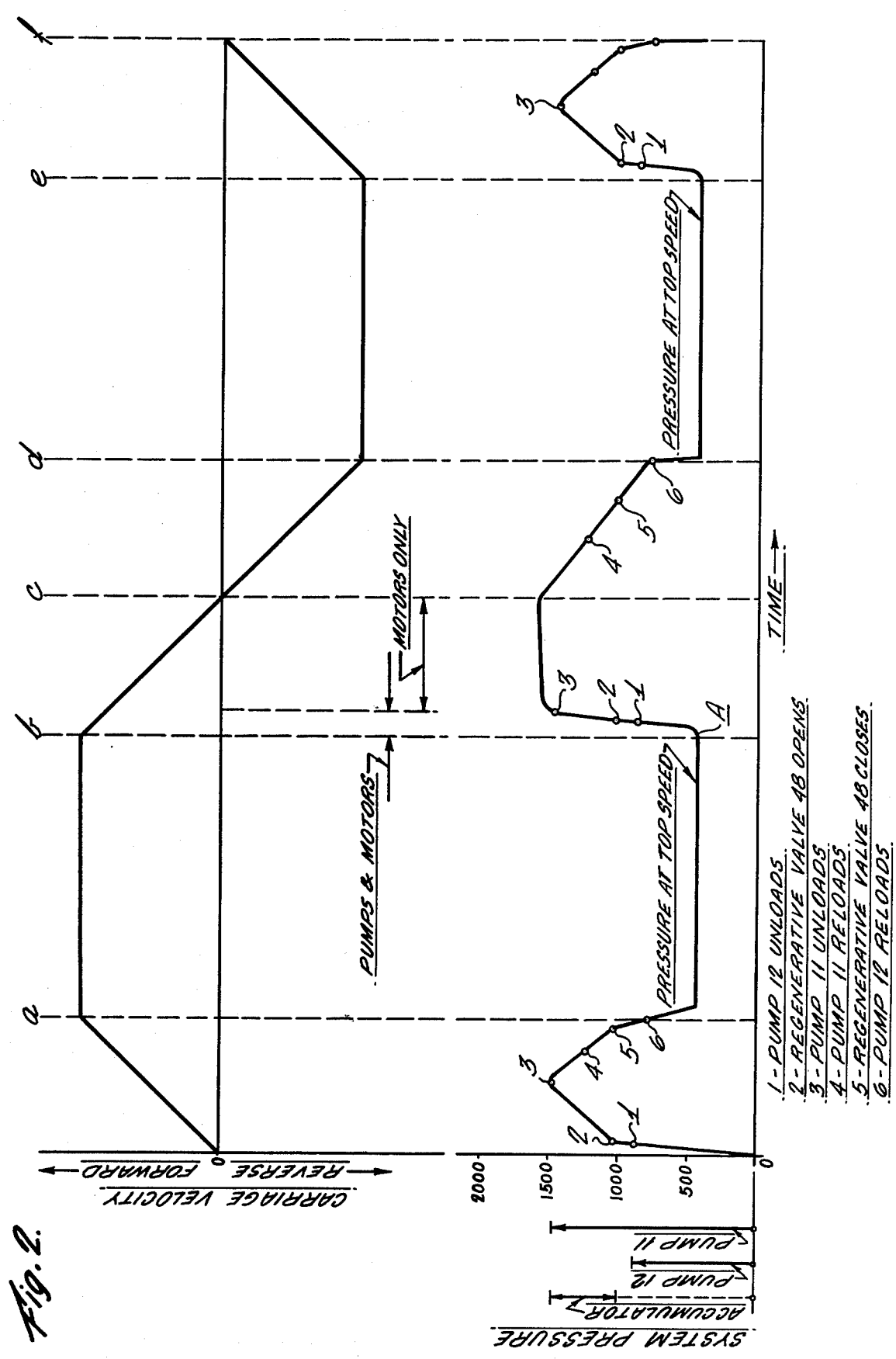

REGENERATIVE DRIVE SYSTEM

FIELD OF THE INVENTION

This invention relates to hydraulic drive systems for heavy reciprocating equipment and more particularly to improvements in hydraulic drive systems which reduce the horsepower requirements imposed on the prime mover for the equipment.

BACKGROUND OF THE INVENTION

Hydraulic systems for driving saw mill carriages have been in use for some years. One such system satisfactory for the purpose is the Tyrone-Berry carriage Model No. SMA-260 manufactured by the Forest Products Division of Tyrone Hydraulics, Inc. of Ashland, Mississippi. This system utilizes fixed displacement hydraulic pumps and motors. The hydraulic system gives great speed and power plus instant reversibility and fast carriage return. There is a positive, fingertip control over carriage speed and direction which eliminates sawyer fatigue. The hydraulic pumps and motors are extremely durable and are ideally suited for the rugged service to which they are exposed in this type of operation. The drive is extremely smooth and flexible.

Some idea of the loads imposed on this type of equipment can be seen when it is realized that a saw mill carriage is frequently loaded with a log weighing a ton or more and desirably must accelerate this load very rapidly to a typical speed of 13 feet per second in about 4 feet. At the end of the stroke the carriage must be stopped rapidly and returned to initial position in the shortest possible time. The problem with such systems is that a large amount of energy is required for relatively short periods of time whereas for significant portions of a cycle of operation a relatively small fraction of rated horsepower is required. In known prior art systems, all of the energy required has been supplied by the prime mover of the carriage drive. With these systems, a relatively large prime mover is required, having a horsepower rating which is large enough to supply the peak horsepower requirements of the carriage. The problem with such a system is that such a prime mover is considerably larger than is required for most portions of the operating cycle and as a consequence is more expensive in the first instance and not as fuel efficient as is desirable.

SUMMARY OF THE INVENTION

According to the invention, a reciprocating carriage such as a saw mill carriage is provided with a hydraulic drive system which captures, stores and reuses the energy produced when the carriage is started and stopped. Storage means is provided for the hydraulic fluid so that it is stored under pressure and then released to produce power when power demands are highest. According to the invention, in the illustrative embodiment, approximately 85% of the energy required to accelerate and stop the carriage is captured and used in the acceleration portion of a subsequent cycle. Input horsepower can be cut by as much as 40%, permitting a reduction in prime mover size and substantial reductions in heat losses.

Among the specific objects of the invention is the provision of a drive system which derives energy from the system itself during periods in a cycle of low energy use and uses this energy later on as required as a supplement to and substitute for the energy supplied by the prime mover.

Another object of the invention is the provision in a drive for a reciprocating carriage, of a hydraulic control system utilizing fixed displacement pumps and motors, wherein the pump action of the motors driving the carriage during certain portions of an operating cycle is used to charge an accumulator in which hydraulic fluid under pressure is saved for later use when required.

A still further object of the invention is the use of a combination of a multi-section pump, a special control valve system, means for storing hydraulic fluid under pressure for future use with a special valve section which senses power demands and automatically diverts the fluid to the storage system and releases it when required.

These and other objects and advantages of the invention will be apparent upon reference to the following detailed description of an illustrative embodiment of the invention and from the drawings thereof in which:

FIG. 1 is a schematic view of a system incorporating the principles of the invention; and FIG. 2 shows plots of carriage velocity and system pressure with respect to time, during an operating cycle.

DETAILED DESCRIPTION OF THE INVENTION

Figure 1:
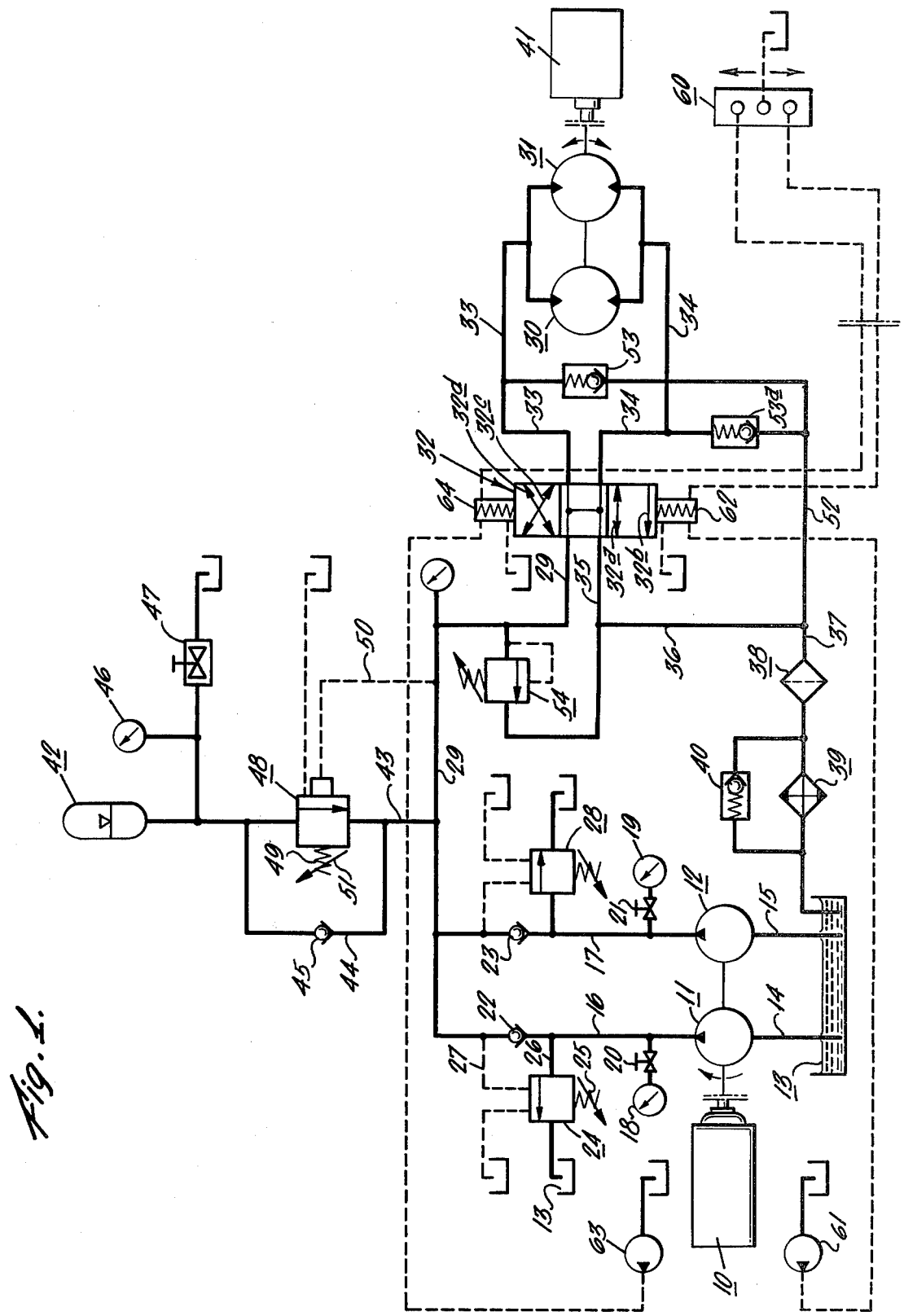

Turning first to FIG. 1, in the illustrative embodiment of the invention a prime mover 10 is illustrated driving independently unloadable pump means comprising a plurality of fixed displacement pump sections 11 and 12 which are preferably of the gear type. Operation of the pumps 11 and 12 draws fluid from a reservoir 13 by way of intake conduits 14 and 15 and discharges the fluid under pressure through conduits 16 and 17. Gauges 18 and 19 are provided for the purpose of giving a reading of the discharge pressure of each of the pumps. Preferably the gauges 18 and 19 are selectively connected to the lines 16 and 17 by means of valves 20 and 21. Check valves 22 and 23 are provided in conduits 16 and 17 at points spaced downstream from the indicators. A first pressure unloading valve 24 is preset to unload at a preselected pressure by means of an adjustable spring-type loading device 25. The valve 24 is connected to the conduit 16 by means of a passage 26. A pilot passage 27 applies the load pressure to one side of the valve and acts against the spring pressure to move the valve to the position in which a passage is completed to the reservoir, schematically represented at 13. A second unloading valve 28 is provided for unloading pump 12 when the discharge pressure exceeds a preselected level. As is conventional with valves of this type, valves 24 and 28 open to provide a discharge path to reservoir at a given value and do not close until a second pressure value somewhat lower than the first value is reached. As will be explained hereinafter, the pressure values at which pump 11 loads and reloads are different from the values at which pump 12 loads and reloads.

The fluid discharged by pumps 11 and 12 is delivered via conduit 29 to motor means comprising a pair of reversible, fixed displacement hydraulic motors 30 and 31. An operator controlled valve 32 is movable from the neutral position illustrated to a first or forward position wherein valve passages 32a and 32b connect the conduit 29 to the motors via a conduit 33 which serves as the supply conduit when the valve is in the position in the schematic representation of FIG. 1. The motors discharge fluid through conduit 34, the valve passage 32b, and conduits 35, 36, and 37 to the reservoir 13. An oil filter 38 and oil cooler 39 are located in the conduit 37. As is conventional practice, the oil cooler is provided with a bypass relief valve 40.

Operation of the valve 32 to effect reversal of the motors and hence of the carriage schematically shown at 41 involves moving the valve to the second or reverse position in which conduit 29 is connected to conduit 34 by means of valve passageway 32c. In this position, valve passageway 32d allows for the return of fluid discharged from the motors through line 33 to line 35, to line 36, and line 37 to reservoir.

As indicated previously, the system is provided with storage means comprising an accumulator 42. Accumulator 42 is charged through a line 43 and a line 44 having a check valve 45 which permits flow into the accumulator but blocks flow in the reverse direction. A pressure gauge 46 provides an indication of the charging pressure. If the system is to be shut down, the accumulator may be discharged to the reservoir via a suitable valve 47. As mentioned, the accumulator is intended to be charged at times when the demands for prime mover horsepower are relatively low and to operate when system pressure reaches a predetermined value. For this purpose, an adjustable pressure responsive valve 48 is spring loaded to the closed position by means of spring 49 so that flow out of the accumulator is blocked at pressures below a predetermined level. When the system pressure reaches the desired level as sensed through a pilot passage 50, the valve is shifted against the bias of spring 49 to the open position in which the accumulator supplies fluid under pressure to the conduit 29 for driving the motors 30 and 31. An adjustable device represented schematically by the arrow 51 is provided for adjusting the bias of the spring 49 so that the valve will respond at the desired pressure.

As indicated, during certain portions of the cycle the motors 30 and 31 will be driven by the carriage so that they are caused to act as pumps due to the heavy inertial forces involved in the carriage after the carriage has reached operating speed. Pumping action occurs at the point the valve 32 has been moved to the reverse position, i.e. to the position in which conduit 29 is disconnected from conduit 33 and passageway 32c interconnects conduit 29 and conduit 34. In this position, fluid under pressure is no longer supplied to the motor inlets. Assuming that the shaft interconnecting the motors with the carriage is being rotated in the direction which causes conduit 33 to be at lower pressure than conduit 34, fluid will be drawn from the reservoir 13 through line 37 through line 52 and anticavitation check valve 53 to the conduit 33 to the low pressure inlets of the motors 30 and 31. This fluid is discharged via the outlet 34 through valve passageway 32c and the line 29 and thence to the accumulator through the valve 48 and/or check valve 45.

Pressure responsive valve 54 is set to unload at a predetermined upper limit for the entire system. Should this limiting pressure be reached for any reason whatsoever, valve 54 opens to maintain system pressure at a safe level by by-passing fluid pumped by the motors to the reservoir 13.

Although valve 32 may be controlled by other means, it is preferred that a separate hydraulically operated assist mechanism is utilized for ease of control by the operator. For this purpose a transmitter schematically shown at 60 is movable by the operator from a neutral position to which it normally returns to a first position in which fluid from a pilot pump 61 is delivered to a pilot chamber 62 at the end of the spool of valve 32. This moves the valve 32 to the forward position described above wherein conduit 29 is connected to conduit 33 by passageway 32a and conduits 34 and 35 are connected by a passageway 32b. Movement of the transmitter in the opposite direction to the reverse position causes pilot pump 61 to apply fluid under pressure to pilot chamber 64 to move the spool of valve 32 to the position wherein conduit 29 is connected to conduit 34 by means of passageway 32c and conduit 33 and 35 are connected by means of passageway 32d.

Reference is now made to FIG. 2 for a description of the operation of the drive system shown in FIG. 1. The top portion of FIG. 2 is a plot of carriage velocity versus time during a cycle of operaton of the carriage. During the first part of the cycle, the carriage velocity builds up to a peak velocity at point "a" on the curve at which the carriage is maintained during the sawing of a log. At the end of the sawing operation, as is indicated by point "b", the operator moves the transmitter 60 to the reverse position at which valve 32 is moved to the position in which conduit 29 is connected to conduit 34 and conduit 35 is connected to conduit 33. During this part of the cycle, the forces of inertia keep the carriage in motion for a further period of time during which the motors are acting as pumps. The carriage velocity drops to zero as represented by point "c" and then increases in the reverse direction until point "d" is reached. At point "e " the valve 32 is returned to the first position and the carriage velocity returns to zero as shown at point "f".

The lower part of FIG. 2 is a typical plot of pressure versus time during an operating cycle and will serve to illustrate a representative cycle of operation. To initiate operation, valve 32 is moved to the forward position in which conduit 29 is connected to conduit 33 by means of valve passageway 32a and conduit 34 is connected to conduit 35 by means of valve passageway 32b. Both pumps are connected to the motors. As the motors apply torque to move the carriage, pressure builds up until a pressure value 1 is reached at which pump 12 is unloaded by unloading valve 28. Regenerative valve 48 opens at pressure value 2. Pump 11 and the accumulator supply fluid under pressure to the system assuming that the accumulator has been charged in a previous cycle. Both pump 11 and the accumulator 42 act to drive the motors until the pressure value 3 is reached at which valve 24 responds and pump 11 is unloaded to the reservoir. At this point, only the accumulator 42 is supplying fluid under pressure to operate the motors 30 and 31. As maximum velocity is reached, pressure drops until point 4 is reached at which pump 11 is reconnected to the system; as the pressure drops off further, the accumulator valve 48 again closes at pressure value 5 and pump 12 is reloaded into the system at pressure value 6. At the end of the cut (point A) the operator throws the transmitter into the reverse position in which valve 32 is shifted so that conduit 29 is connected with conduit 34 and conduit 35 is connected with conduit 33. With the valve in the reverse position and the carriage in motion at relatively high velocity, the motors 30 and 31 act like pumps drawing fluid from the reservoir via line 37 through anticavitation check valve 53 and conduit 33. This fluid is pumped out through conduit 34 through value passageway 32c and through conduit 29 to the accumulator. As soon as pressure builds up to value 1 (to the right of the point labelled "A" on the lower curve illustrated in FIG. 2) at which valve 28 opens, pump 12 is cut out of the system. Shortly thereafter at pressure value 2, accumulator valve 48 opens. At pressure value 3 valve 24 opens to cut pump 11 out of the system. At this point and until zero velocity is reached, the motors 30 and 31 continue to operate as pumps to fully charge the accumulator and also act to brake the carriage. The accumulator is now available to drive the motors as required in the reverse direction and does so alone until pressure value 4 is reached at which pump 11 reloads. At pressure value 5 the accumulator valve 48 again closes. As carriage velocity begins to increase and the pressure drops further, valve 24 closes at pressure value 6 so that pump 12 is also reconnected into the system.

At this point, full reverse velocity has been reached and is maintained until such time as the operator actuates the transmitter 60 to return valve 32 to the position in which conduit 33 is connected to conduit 29 by means of valve passageway 32a and conduit 34 is connected to conduit 35 by means of valve passageway 32b. In this position the carriage again acts as a power input device to cause the motors 30 and 31 to act as pumps drawing fluid from the reservoir 14 by the conduit 37, conduit 36 or anticavitation check valve 53a to the line 34 to the lowermost motor passages from whence it is pumped through line 33 to the valve 32 through conduit 29 to the accumulator 42. During this portion of the cycle, as pressure rises, first pump 12 will be unloaded at pressure value 1 after which the accumulator will be reconnected to the system at pressure value 2. As pressure continues to rise, pressure from the accumulator will be available to effect reversal of the cycle so long as the operator control is maintained in the position just described.

I claim:

1. A hydraulic drive system for a reciprocating carriage comprising fixed displacement pump means, reversible hydraulic motor means having first and second fluid passages, a fluid supply conduit means for delivery of fluid under pressure from the pump means to the motor mean, control valve means movable to a first position for connecting the conduit means to the first of said passages and for connecting the second passage to a reservoir of fluid, said control valve means being movable to a second position for connecting the conduit means to the second passage and for connecting the first passage to the reservoir, a drive connection between the motor means and the carriage, a hydraulic accumulator connected to said conduit means, accumulator valve means for discharge of fluid under pressure from the accumulator to the conduit means in response to load pressures in said conduit means in excess of a predetermined value, and means for recharge of said accumulator, means including said drive connection, whereby the inertial forces on the carriage drive said motor means as a pump to deliver operating fluid under pressure to said accumulator for use during other portions of an operating cycle, said accumulator recharge means being operative following movement of the control valve means from one of said positions to the other position after said carriage has attained a desired carriage velocity.

2. A drive system according to claim 1, wherein said accumulator valve means includes means for preventing discharge of the accumulator at pressures below the predetermined load pressure.

3. A drive system according to claim 1, wherein said fixed displacement pump means comprises a first pump and a second pump, and means for unloading said first pump at a load pressure below the value at which the accumulator is discharging to the motor means.

4. A drive system according to claim 3 further including means for unloading said second pump at load pressures above the value at which the accumulator is discharging to the motor means.

5. A drive system for a reciprocating carriage comprising first and second fixed displacement pump means driven by a prime mover, reversible motor means driven by pressurized fluid from said pump means, a drive connection between the motor means and the carriage whereby motor driving force drives the carriage in a first direction in one portion of a cycle and in a reverse direction in a second portion of the cycle, means for unloading one of said pump means at pressures above a predetermined value, a rechargeable accumulator, pressure responsive valve means for connecting said accumulator to the motor means in a range of pressures above said predetermined value, said valve means providing communication of the motor means to the accumulator at times when the force of inertia of said carriage cause the motor means to act as pump means to charge said accumulator to a pressure in the range of pressures above said predetermined value when the carriage is being reversed, said accumulator pressure being available to operate the motor means at other portions of the cycle when the accumulator is connected to the motor means.

6. A drive system for minimizing horsepower demands of heavily loaded reciprocating saw mill carriages or the like, comprising: fixed displacement hydraulic pump means driven by a prime mover; fixed displacement reversible hydraulic motor means, a drive connection between said motor means and said reciprocating carriage, an hydraulic circuit between said pump means and said motor means including valve means movable to a first position to interconnect the pump means with the motor means for driving said motor means in a direction in which the motor means applies driving force to said carriage to move said carriage in a first direction in a first portion of a cycle, said valve means being movable to a second position for reversibly interconnecting the pump means to the motor means for causing said motor means to apply driving force to the carriage to move the carriage in the opposite direction in a second portion of the cycle, a rechargeable accumulator in said hydraulic circuit, means for connecting the accumulator to the motor means when load pressure exceeds a predetermined value, and accumulator regenerating means operative upon movement of the valve means to the second position for interconnecting a source of fluid, the motor means and the accumulator whereby the forces of inertia drive the motor means to deliver fluid under pressure to the accumulator during that part of the first portion of the cycle remaining after the valve means is moved from the first to the second position, said accumulator pressure being available to drive the motor means at other portions of the cycle when load pressures exceed a predetermined value.

7. A hydraulic system according to claim 6 further including unloading valve means for said pump means, said unloading valve means being responsive to a predetermined high pressure value to unload excess fluid discharged by said pump means at load pressures above said predetermined value.

8. A hydraulic system according to claim 1 further including unloading valve means for said pump means, said unloading valve means being responsive to a predetermined high pressure value to unload excess fluid discharged by said pump means at load pressures above said predetermined value.

9. A hydraulic system according to claim 8 wherein said unloading valve means unloads a portion of the fluid discharged by said pump means at a value below the predetermined value at which said accumulator discharges to the conduit means and for unloading all of the fluid discharged by the pump means at a predetermined value above the value at which said accumulator discharges to the conduit means.

* * * * *

UNITED STATES PATENT AND TRADEMARK OFFICE
CERTIFICATE OF CORRECTION

PATENT NO. : 4,204,405
DATED : May 27, 1980
INVENTOR(S) : Deam V. Basham

It is certified that error appears in the above—identified patent and that said Letters Patent are hereby corrected as shown below:

Column 4, Line 66, "value" should be --valve--

Column 5, Line 42, "motor mean," should be --motor (S, ) means,

Signed and Sealed this

Eighteenth Day of November 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,204,405
DATED : May 27, 1980
INVENTOR(S) : Dean V. Basham

It is certified that error appears in the above—identified patent and that said Letters Patent is hereby corrected as shown below:

Column 4, line 66, "value" should be --valve--.

Column 5, line 42, "motor mean," should be --motor, means--.

This certificate supersedes Certificate of Correction issued November 18, 1980.

Signed and Sealed this

Tenth Day of March 1981

[SEAL]

Attest:

RENE D. TEGTMEYER

Attesting Officer

Acting Commissioner of Patents and Trademarks